(12) United States Patent
Nakata

(10) Patent No.: US 8,842,566 B2
(45) Date of Patent: Sep. 23, 2014

(54) TRANSMISSION RATE ESTIMATION METHOD, TRANSMISSION RATE ESTIMATION APPARATUS, TRANSMISSION RATE ESTIMATION SYSTEM AND RECORDING MEDIUM OF CONTROL PROGRAM OF TRANSMISSION RATE ESTIMATION APPARATUS

(75) Inventor: Tsuneo Nakata, Tokyo (JP)

(73) Assignee: NEC Corporation, Tokyo (JP)

( * ) Notice: Subject to any disclaimer, the term of this patent is extended or adjusted under 35 U.S.C. 154(b) by 62 days.

(21) Appl. No.: 13/580,420

(22) PCT Filed: Apr. 15, 2011

(86) PCT No.: PCT/JP2011/059878
§ 371 (c)(1),
(2), (4) Date: Aug. 22, 2012

(87) PCT Pub. No.: WO2011/132758
PCT Pub. Date: Oct. 27, 2011

(65) Prior Publication Data
US 2012/0320780 A1    Dec. 20, 2012

(30) Foreign Application Priority Data
Apr. 21, 2010  (JP) ................. 2010-097625

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl.
CPC ............. *H04L 43/0894* (2013.01); *H04L 43/10* (2013.01)
USPC ........... 370/252; 370/253; 370/235; 709/224; 709/226

(58) Field of Classification Search
CPC .............................. H04W 36/00; H04B 17/00
USPC ......... 370/252, 329, 235, 230, 338, 278, 392, 370/232, 238, 253, 277, 474; 709/224, 213, 709/226, 228, 248; 455/445, 456.1, 426.1, 455/434
See application file for complete search history.

(56) References Cited

U.S. PATENT DOCUMENTS 7,710,321 B2 *  5/2010  Heidari-Bateni et al. ..... 342/458
8,593,985 B2 * 11/2013  Oue et al. ...................... 370/252

(Continued)

FOREIGN PATENT DOCUMENTS

EP      1 705 834 A1     9/2006
JP      2006261755 A     9/2006

(Continued)

OTHER PUBLICATIONS

Ribiero et al. (pathChirp: Efficient Bandwidth Estimation for Network Paths, Presented at Passive and Active Monitoring Workshop (PAM 2003), SLAC, SLAC-PUB-9732, Apr. 8, 2003).*

(Continued)

*Primary Examiner* — Benjamin H Elliott, IV
*Assistant Examiner* — Eric Nowlin
(74) *Attorney, Agent, or Firm* — Sughrue Mion, PLLC

(57) ABSTRACT

In order to enable to judge validity of a measurement result of a transmission rate, a speed estimation method transmits a data packet and probe packets before and after the data packet to a measured section which is a target for measurement of a transmission rate, estimates a transmission rate of a measured section based on a first receiving interval which is a receiving interval between the probe packets transmitted through the measured section just before and immediately after the data packet and a data volume of the data packet, and determines validity of a transmission rate by comparing a second receiving interval which is a receiving interval between the probe packets which have passed the measured section continuously in a state that a data packet does not exist in between them in a measured section and a first receiving interval.

6 Claims, 12 Drawing Sheets

(56) References Cited

U.S. PATENT DOCUMENTS

| | | |
|---|---|---|
| 2006/0030323 A1* | 2/2006 | Ode et al. ................ 455/436 |
| 2006/0215572 A1* | 9/2006 | Padhye et al. ............ 370/252 |
| 2008/0186917 A1* | 8/2008 | Wu et al. ................. 370/331 |
| 2009/0190493 A1* | 7/2009 | Nakata ..................... 370/253 |
| 2010/0046388 A1* | 2/2010 | Kim et al. ................ 370/252 |
| 2010/0110892 A1* | 5/2010 | Lai et al. .................. 370/235 |
| 2010/0165863 A1 | 7/2010 | Nakata |

FOREIGN PATENT DOCUMENTS

| | | |
|---|---|---|
| JP | 2006270953 A | 10/2006 |
| JP | 2008294902 A | 12/2008 |
| JP | 2010074600 A | 4/2010 |
| WO | 2005069558 A1 | 7/2005 |

OTHER PUBLICATIONS

The international search report for PCT/JP2011/059878.

Written Opinion of the International Searching Authority for PCT/JP2011/059878.

K. Harfoush et al., "Measuring Capacity Bandwidth of Targeted Path Segments", IEEE/ACM Transactions on Networking, pp. 80-92, vol. 17, No. 1, Feb. 1, 2009, IEEE I ACM, New York, NY, US. See cited doc on p. 2 of the extended EP search report for explanation of relevance.

The extended European search report for EP Application No. 11772090.4 dated on Oct. 24, 2013.

\* cited by examiner

TRANSMISSION RATE ESTIMATION METHOD, TRANSMISSION RATE ESTIMATION APPARATUS, TRANSMISSION RATE ESTIMATION SYSTEM AND RECORDING MEDIUM OF CONTROL PROGRAM OF TRANSMISSION RATE ESTIMATION APPARATUS

TECHNICAL FIELD

The present invention relates to a speed estimation method, a speed estimation apparatus, a speed estimation system and a recording medium of a control program of a speed estimation method for estimating a transmission rate of a transmission section using a probe packet.

BACKGROUND ART

In a packet transmission system, there is known a method which is called a packet dispersion method which estimates a transmission rate of a link which is a bottleneck of a transmission rate from packet dispersion. Here, "packet dispersion" means a temporal spread of arrival intervals of a packet caused by a transmission delay. In patent document 1, a structure of a speed calculation system equipped with a function to estimate a speed of a link which will be a bottleneck by the packet dispersion method is disclosed.

An estimation method of a band of a link which is not a bottleneck is disclosed in patent document 2. The estimation method of a band disclosed in patent document 2 measures packet dispersion after, in a plurality of routes sharing a section to be measured, a packet group have passed the measured section. By this, the estimation method of a band disclosed in patent document 2 makes it possible to estimate a transmission rate of a measured section even when a band of the measured section is not a bottleneck in a route.

CITATION LIST

Patent Document

[Patent document 1] Republication patent No. WO 2005/069558 official bulletin (paragraph [0057])
[Patent document 2] Japanese Patent Application Laid-Open No. 2008-294902 (paragraph [0034])

SUMMARY OF INVENTION

Technical Problem

In order to estimate the transmission rate of a link by the packet dispersion method with high reliability, at the time of measuring packet dispersion, arrival intervals between a plurality of packet groups to a measured section need to be short sufficiently. However, by the methods disclosed in patent document 1 and patent document 2, it is not possible from measurement results of packet dispersion to know arrival intervals between packets to a measured section. For this reason, the methods disclosed in patent document 1 and patent document 2 have a problem that it is not possible to judge validity of a transmission rate measured.

An object of the present invention is to provide a speed estimation method, a speed estimation apparatus, a speed estimation system and a recording medium of a control program of a speed estimation method for settling a problem that validity of a measurement result of the transmission rate cannot be judged at the time of estimating the transmission rate of a communication section.

Solution to Problem

A speed estimation method of the present invention includes the steps of transmitting a data packet and probe packets before and after the data packet, the measured section being a measurement target of a transmission rate to a measured section, estimating a transmission rate of the measured section based on a first receiving interval which is a receiving interval between the probe packets transmitted through the measured section just before and immediately after the data packet and a data volume of the data packet, and determining validity of the transmission rate by comparing a second receiving interval which is a receiving interval between the probe packets having passed the measured section continuously in a state the data packet not existing in between the probe packets in the measured section, and the first receiving interval.

Further, a speed estimation apparatus of the present invention, includes a reception means for receiving probe packets from a communication section, a data storage means for storing information on a data volume of a data packet, a reception timing measuring means for detecting a first receiving interval which is a receiving interval between the probe packets having been transmitted just before and immediately after the data packet through a measured section being a target of measurement of a transmission rate, and a second receiving interval which is a receiving interval between the probe packets having passed the measured section continuously in the measured section, and a speed estimation means for estimating a transmission rate of the measured section based on the first receiving interval and a data volume of the data packet, and judging validity of the transmission rate by comparing the first receiving interval and the second receiving interval.

Further, a recording medium of a control program of a speed estimation method of the present invention stores a control program of a speed estimation apparatus for causing the speed estimation apparatus function as a reception means for receiving probe packets from a communication section, a data storage means for storing information on a data volume of a data packet, a reception timing measuring means for detecting a first receiving interval which is a receiving interval between the probe packets having been transmitted just before and immediately after the data packet through a measured section being a target of measurement of a transmission rate, and a second receiving interval which is a receiving interval between the probe packets having passed the measured section continuously in the measured section, and a speed estimation means for estimating a transmission rate of the measured section based on the first receiving interval and the data volume of the data packet, and judging validity of the transmission rate by comparing the first receiving interval and the second receiving interval.

Advantageous Effects of Invention

The present invention has an effect that it enables to judge validity of a measurement result of a transmission rate.

DETAILED DESCRIPTION OF THE INVENTION

The First Exemplary Embodiment

Figure 1:
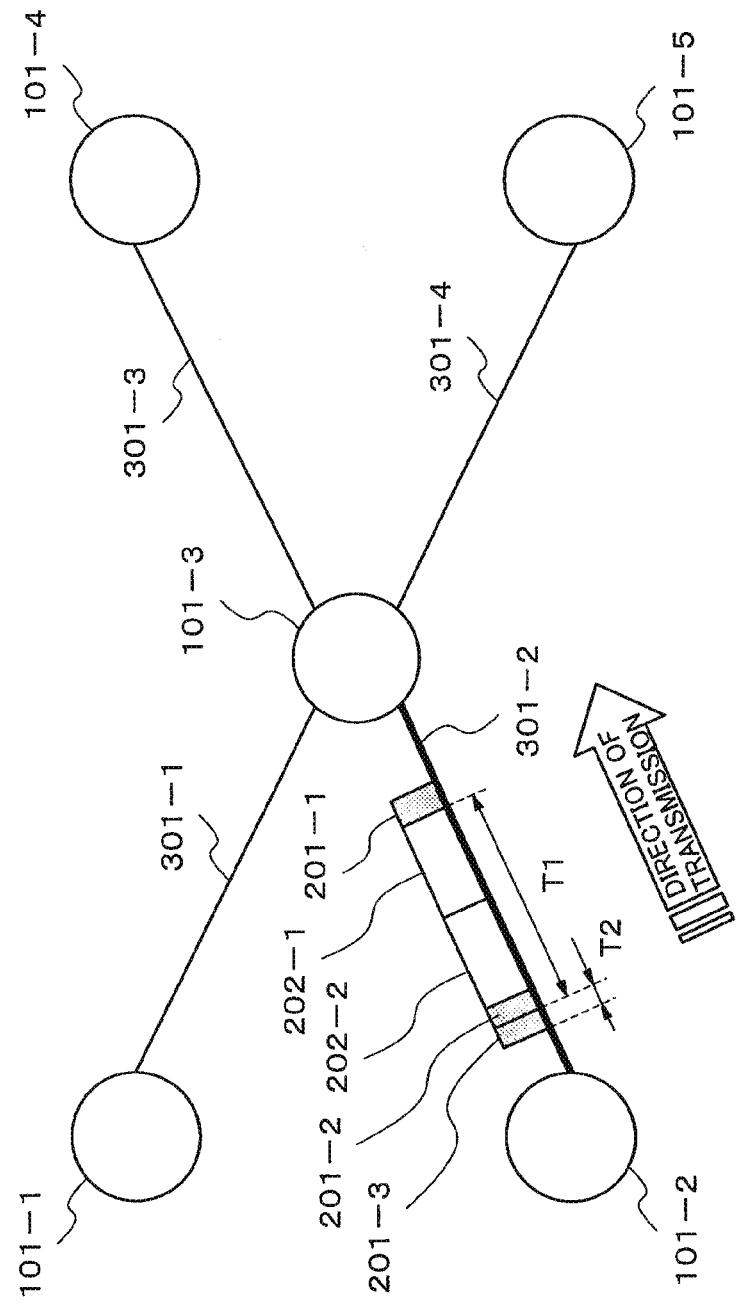
FIG. 1 is a diagram showing a state that packets exist between a node 101-2 and a node 101-3 in a first exemplary embodiment.

The first exemplary embodiment of a band estimation method of the present invention will be described using FIGS. 1-5. FIG. 1 is a diagram showing a state that packets exist between a node 101-2 and a node 101-3 in the first exemplary embodiment. In FIG. 1, symbols 101-1 to 101-5 denote communication nodes, and 301-1 to 301-4 denote communication sections between nodes. A communication section includes no smaller than one communication link.

Figure 2:
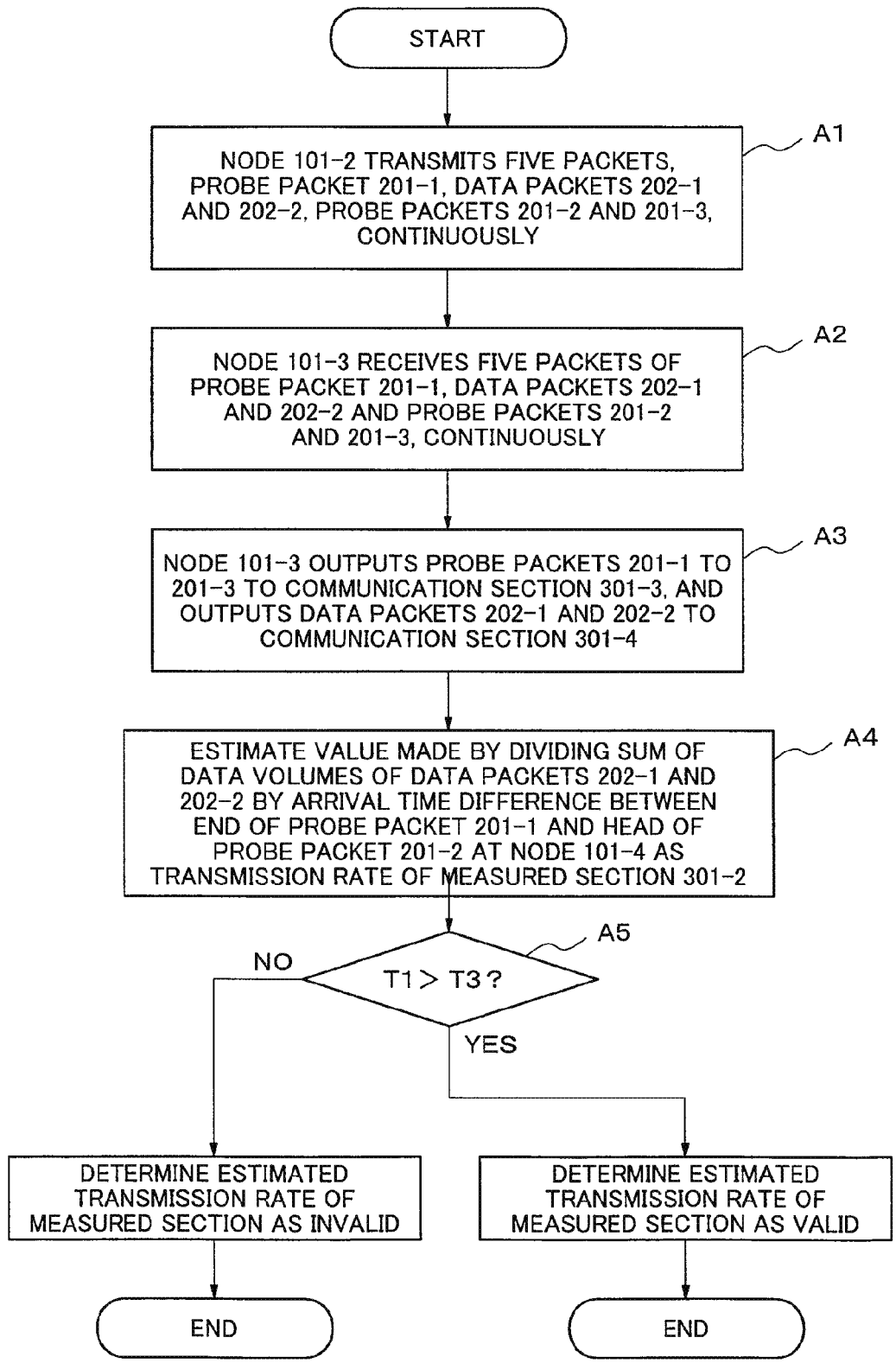
FIG. 2 is a diagram showing a procedure of a speed estimation method in the first exemplary embodiment.

FIG. 2 is a diagram showing a procedure of a speed estimation method in the first exemplary embodiment.

In the first exemplary embodiment, the communication section 301-2 is a measured section of a transmission rate. Here, it is supposed that both communication sections 301-3 and 301-4 have a speed lower than that of the measured section 301-2. Hereinafter, a procedure of a speed estimation method will be described, referring also to each step of FIG. 2.

The starting point node 101-2 in the probe route in FIG. 1 transmits five packets, a probe packet 201-1, data packets 202-1 and 202-2, probe packets 201-2 and 201-3, continuously (Step A1). Here, the probe packets are transmitted to the node 101-4 via the node 101-3 taking the node 101-2 as their source. The sizes of all probe packets are identical. The data packets 202-1 and 202-2 are transmitted to the node 101-5 via the node 101-3 taking the node 101-2 as the source.

It is supposed that an arrival time difference between the probe packet 201-1 and probe packet 201-2 at the node 101-3 is T1. Also, a difference between the arrival times of the probe packets 201-2 and 201-3 at the node 101-3 is supposed to be T2.

Figure 3:
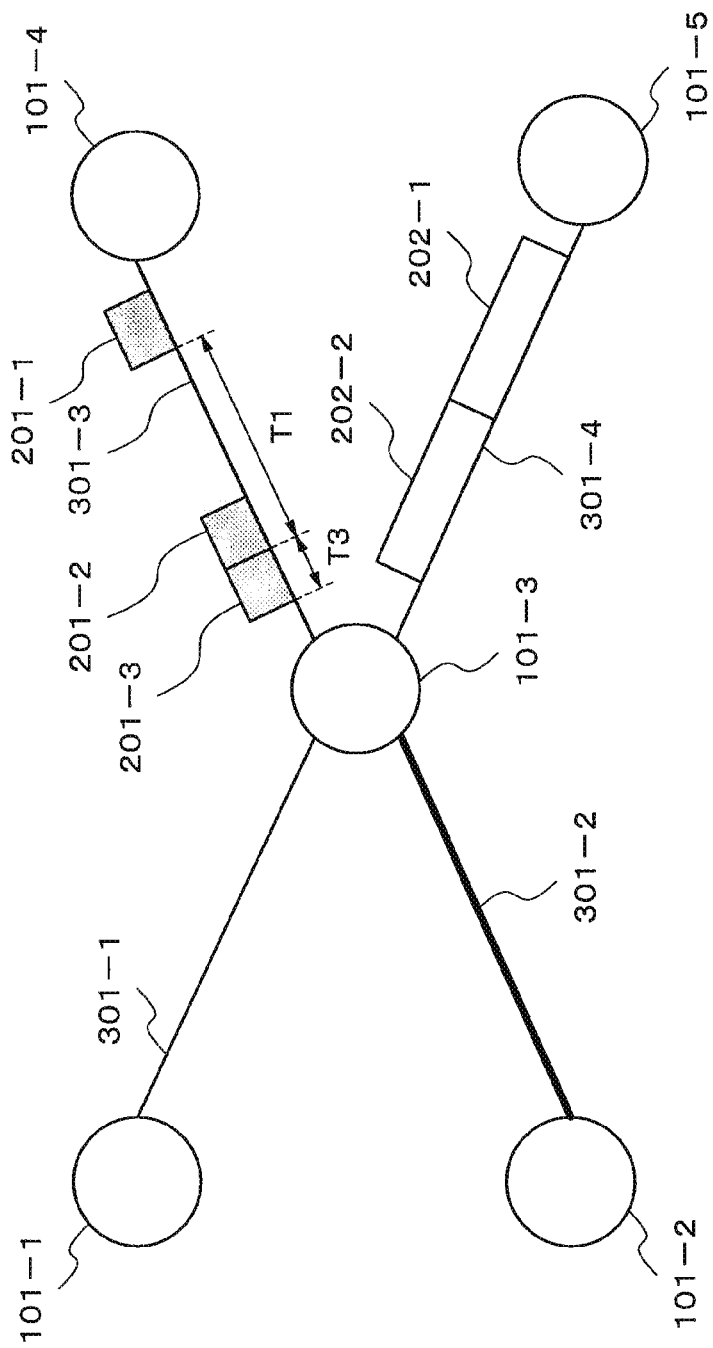
FIG. 3 is a diagram showing a state after packets have passed the node 101-3 in the first exemplary embodiment.

FIG. 3 is a diagram showing a state after the packets transmitted by the node 101-2 have passed the node 101-3 in the first exemplary embodiment. FIG. 3 shows that the probe packets 201-1 to 201-3 pass the node 101-3 and are then received at the node 101-4, and the data packets 202-1 and 202-2 pass the node 101-3 and are then received at the node 101-5.

In FIG. 3, the node 101-3 receives the five packets of the probe packet 201-1, the data packets 202-1 and 202-2 and the probe packets 201-2 and 201-3 continuously (Step A2). Then, the node 101-3 outputs the probe packets 201-1 to 201-3 to the communication section 301-3, and outputs the data packets 202-1 and 202-2 to the communication section 301-4 (Step A3).

Here, a probe packet which has passed a measured section immediately before or after a data packet is called a collision packet. In FIG. 1, the probe packets 201-1 and 201-2 are collision packets.

The speed of the communication section 301-4 is lower than that of the measured section 301-2. For this reason, a packet arrival interval between the data packets 202-1 and 202-2 after having passed the node 101-3 (that is, packet dispersion) becomes larger than that of the time when these packets have passed the measured section 301-2. Therefore, even if an arrival interval between data packets 202-1 and 202-2 is measured at the node 101-5, and the data volume of the data packets 202-1 and 202-2 is divided by the arrival interval, the transmission rate of the measured section 301-2 cannot be obtained.

On the other hand, because the communication section 301-3 also has a speed lower than that of the measured section 301-2, at the node 101-4, packet dispersion of each packet of the probe packets 201-1 to 201-3 expands from T2 of FIG. 1 to T3 of FIG. 3. However, the difference T1 between arrival time of collision packets, that is, the probe packet 201-1 and 201-2 at the node 101-4 is not affected by a delay by the measured section 301-3. The reason of this is that, because the data packets 202-1 and 202-2 do not exist between the probe packets 201-1 and 201-2 in the communication section 301-3, a delay of a probe packet by a data packet does not occur in the communication section 301-3. In other words, because there are no other packets between the probe packet 201-1 and 201-2 in the communication section 301-3, if delay of the communication section 301-3 is within a range described below, a difference in arrival time of the packets is not expanded beyond T1.

However, when the arrival time difference T3 between the probe packets 201-2 and 201-3 exceeds T1 due to delay of the communication section 301-3, the end of the probe packet 201-1 and the head of the probe packet 201-2 collide with each other. As a result, a difference in arrival time between the probe packet 201-1 and 201-2 measured at the node 101-4 becomes greater than T1 in the measured section 301-2. On the other hand, when the difference T3 in arrival time between the probe packets 201-2 and 201-3 at the node 101-4 due to delay of the communication section 301-3 does not exceed T1, the end of the probe packet 201-1 and the head of the probe packet 201-2 do not collide with each other. That is, when T1>T3 holds at the node 101-4, a case where the end of the probe packet 201-1 reaches the head of the probe packet 201-2 is not caused by delay in the communication section 301-3.

Accordingly, when T1>T3, T1 measured at the node 101-4 can be presumed to represent a difference in arrival time between the probe packets 201-1 and 201-2 at the node 101-3 in the communication section 301-2.

That is, a procedure of Step A4 or later in FIG. 2 is as follows. By dividing the sum of the data volumes of the data packets 202-1 and 202-2 by the arrival time difference T1 between the end of the probe packet 201-1 and the head of the probe packet 201-2 at the node 101-4, the node 101-4 estimates the transmission rate of the measured section 301-2 (Step A4). When T1 and T3 are compared with each other (step A5), and if T1>T3 (step A5: YES), it is determined that the estimated transmission rate of the measured section 301-2 is valid. When the estimated transmission rate of the measured section 301-2 cannot be judged to be valid (step A5: NO), it is determined that the estimated transmission rate is invalid.

Thus, the first exemplary embodiment of the present invention has an effect that judgment of validity of a measurement result of a transmission rate is possible as a result of comparison of the receiving interval T1 between probe packets that have been transmitted immediately before and after data packets and the receiving interval T3 between probe packets that have been transmitted continuously.

Also, according to the first exemplary embodiment, in the communication path 301-3, the data packets 202-1 and 202-2 do not exist between the probe packets 201-1 and 201-2. For this reason, at the node 101-4, because an arrival interval between collision packets is not influenced by delay of a data packet, an arrival interval between the collision packets can be learned more correctly. As a result, the first exemplary embodiment also has an effect that accuracy of an estimated transmission rate improves.

Figure 4:
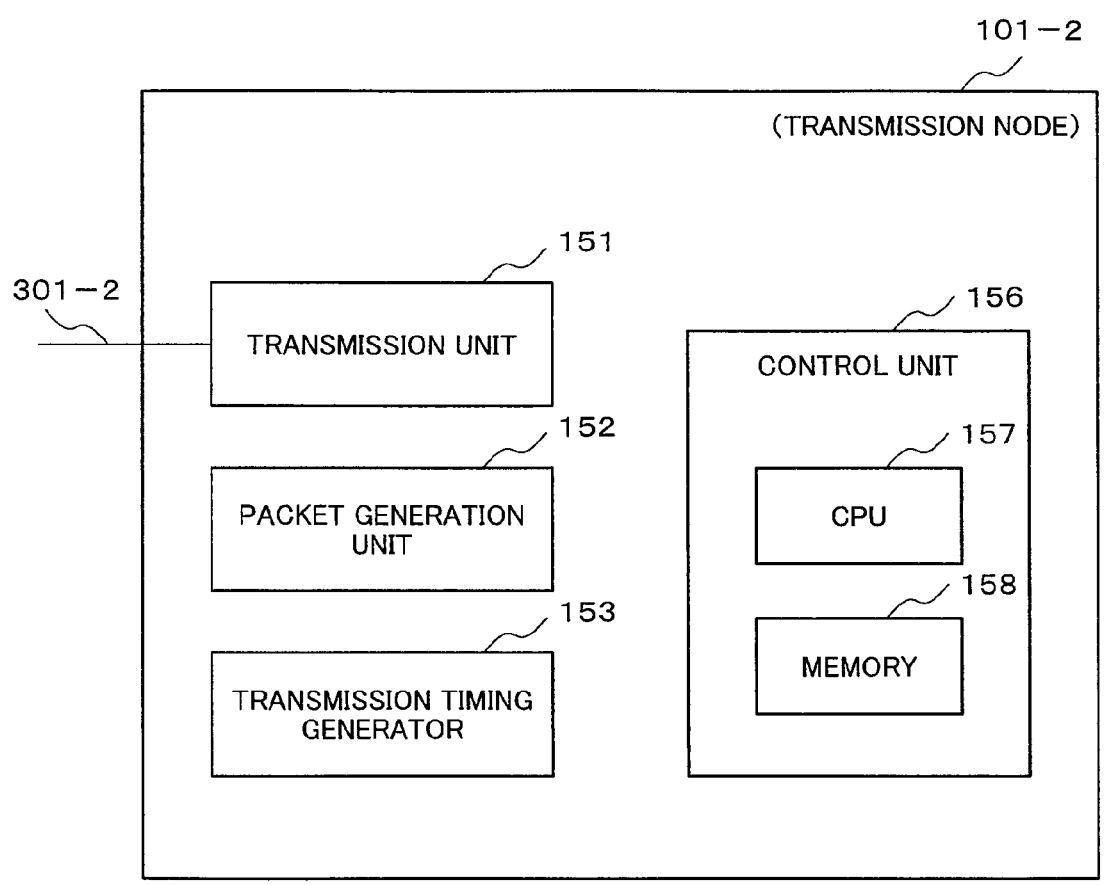
FIG. 4 is a diagram showing a structure of a transmission node used in the first exemplary embodiment.

FIG. 4 is a diagram showing a structure of the node 101-2 that is a transmission node used in the first exemplary embodiment. The node 101-2 shown in FIG. 4 includes a transmission unit 151, a packet generation unit 152, a transmission timing generator 153 and a control unit 156. The transmission unit 151 has a general packet transmitting function as a node. The packet generation unit 152 generates the probe packets 201-1 to 201-3, data packets 202-1 and 202-2 transmitted to the communication section 301-2. The transmission timing generator 153 generates timing when a packet is transmitted to the communication section 301-2. The control unit 156 is a circuit part which controls the whole of the node 101-2 and includes a CPU (Central Processing Unit; central processing unit) 157 and a memory 158. The memory 158 stores a control program and constitutes a work memory. The CPU 157 makes each element which constitutes the node 101-2 function by executing the control program.

Figure 5:
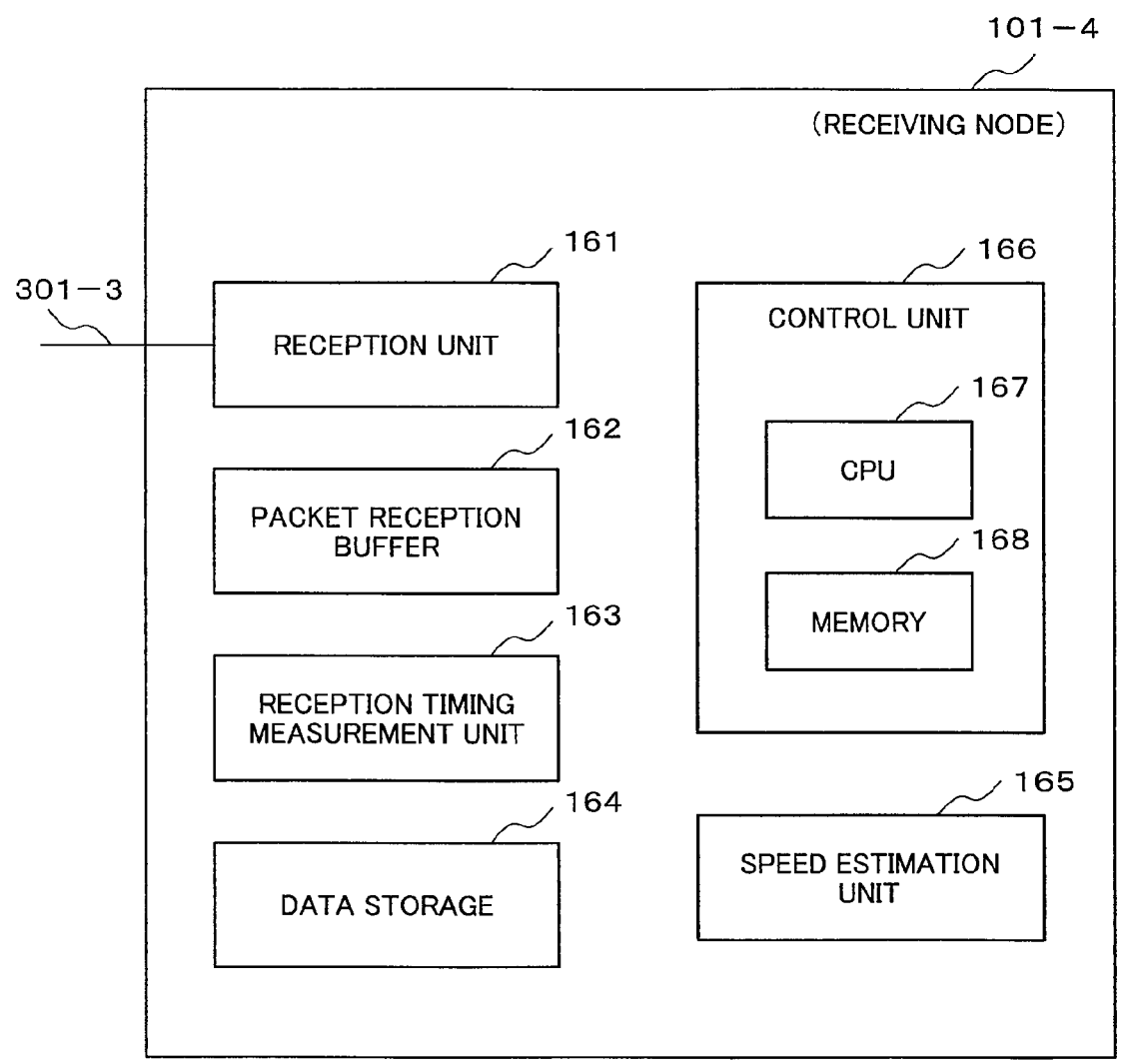
FIG. 5 is a diagram showing a structure of a receiving node used in the first exemplary embodiment.

FIG. 5 is a diagram showing a structure of the node 101-4 that is a receiving node used in the first exemplary embodiment. The node 101-4 includes a reception unit 161, a packet reception buffer 162, a reception timing measurement unit 163, a data storage 164, a speed estimation unit 165 and a control unit 166.

The reception unit 161 has a usual packet receiving function as a node. The packet reception buffer 162 stores the probe packets 201-1 to 201-3 received from the communication section 301-3. The reception timing measurement unit 163 detects reception time of a received packet. The data storage 164 stores information on the data volume of a received packet. By a procedure described in Step A4 and A5 of FIG. 2, the speed estimation unit 165 estimates a transmission rate of a communication section to be a target of measurement of a transmission rate. The control unit 166 is a circuit part which controls the whole of this node 101-4, and includes a CPU 167 and a memory 168. The memory 168 stores a control program and constitutes a work memory. The CPU 167 may make each component constituting the node 101-4 function by executing the control program. Thus, the receiving node shown in FIG. 5 can be called a speed estimation apparatus.

By configuring a node having both functions of the node 101-2 shown in FIG. 4 and the node 101-4 shown in FIG. 5, the node may be allocated as the nodes 101-1, 101-2, 101-4 and 101-5 shown in FIG. 1. By doing so, a probe packet and a data packet can be transmitted from any of the nodes of the nodes 101-1, 101-2, 101-4 and 101-5. In addition, in any of the nodes of the nodes 101-1, 101-2, 101-4 and 101-5, a transmission rate of a measured section can be obtained from a receiving interval between probe packets and a data size of data packets.

Further, a node made by adding a routing function for allocating a route according to a destination of a received packet to a node having both functions of nodes shown in FIG. 4 and FIG. 5 may be arranged as the node 101-3 of FIG. 1. Because a routing function of a packet is well-known, description about a routing function will be omitted.

Meanwhile, in the first exemplary embodiment, the node 101-1 and the communication section 301-1 have been described as an exemplary configuration of a network. The effects of the first exemplary embodiment described in FIGS. 1-5 can also be realized by a structure in which the node 101-1 and the communication section 301-1 are omitted.

Further, the node 101-4 (that is, a speed estimation apparatus) shown in FIG. 5 may include only the reception unit 161, the reception timing measurement unit 163, the data storage 164 and the speed estimation unit 165. In the node 101-4 of such structure, the reception unit 161 receives a probe packet from a communication section. The data storage 164 stores information on the volume of data of a data packet. The reception timing measurement unit 163 measures a first receiving interval and a second receiving interval.

Here, the first receiving interval is a receiving interval between probe packets which have been transmitted immediately before and after a data packet through a measured section which is the target for measurement of a transmission rate. The second receiving interval is a receiving interval between probe packets which have passed a measured section continuously in the measured section.

The first receiving interval and the second receiving interval correspond to T1 and T3 in FIG. 3, respectively. Accordingly, like the procedure in step A5 of FIG. 2, when the first receiving interval is larger than the second receiving interval, a transmission rate estimated by the speed estimation unit 165 is judged to be valid.

That is, by estimating a transmission rate of a measured section based on a first receiving interval and the data volume of a data packet, and comparing the first receiving interval and a second receiving interval, the speed estimation unit 165 can judge validity of the transmission rate.

Thus, the receiving node shown in FIG. 5 has an effect that, if it includes the reception unit 161, the reception timing measurement unit 163, the data storage 164 and the speed estimation unit 165 at least, it enables to judge validity of a measurement result of a transmission rate.

The Second Exemplary Embodiment

Figure 6:
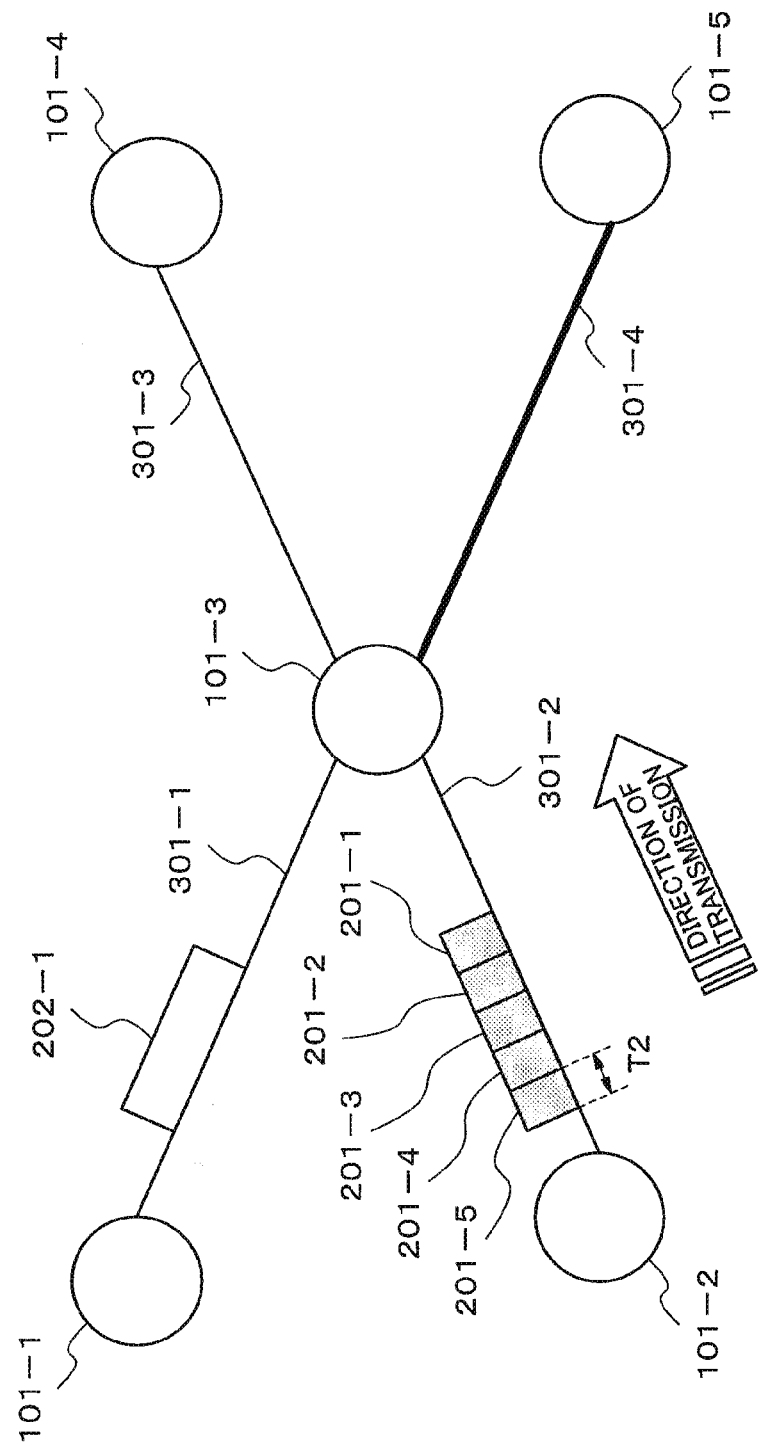
FIG. 6 a diagram showing a state that packets exist between the node 101-1 and the node 101-3, and between the node 101-2 and the node 101-3 in a second exemplary embodiment.
Figure 7:
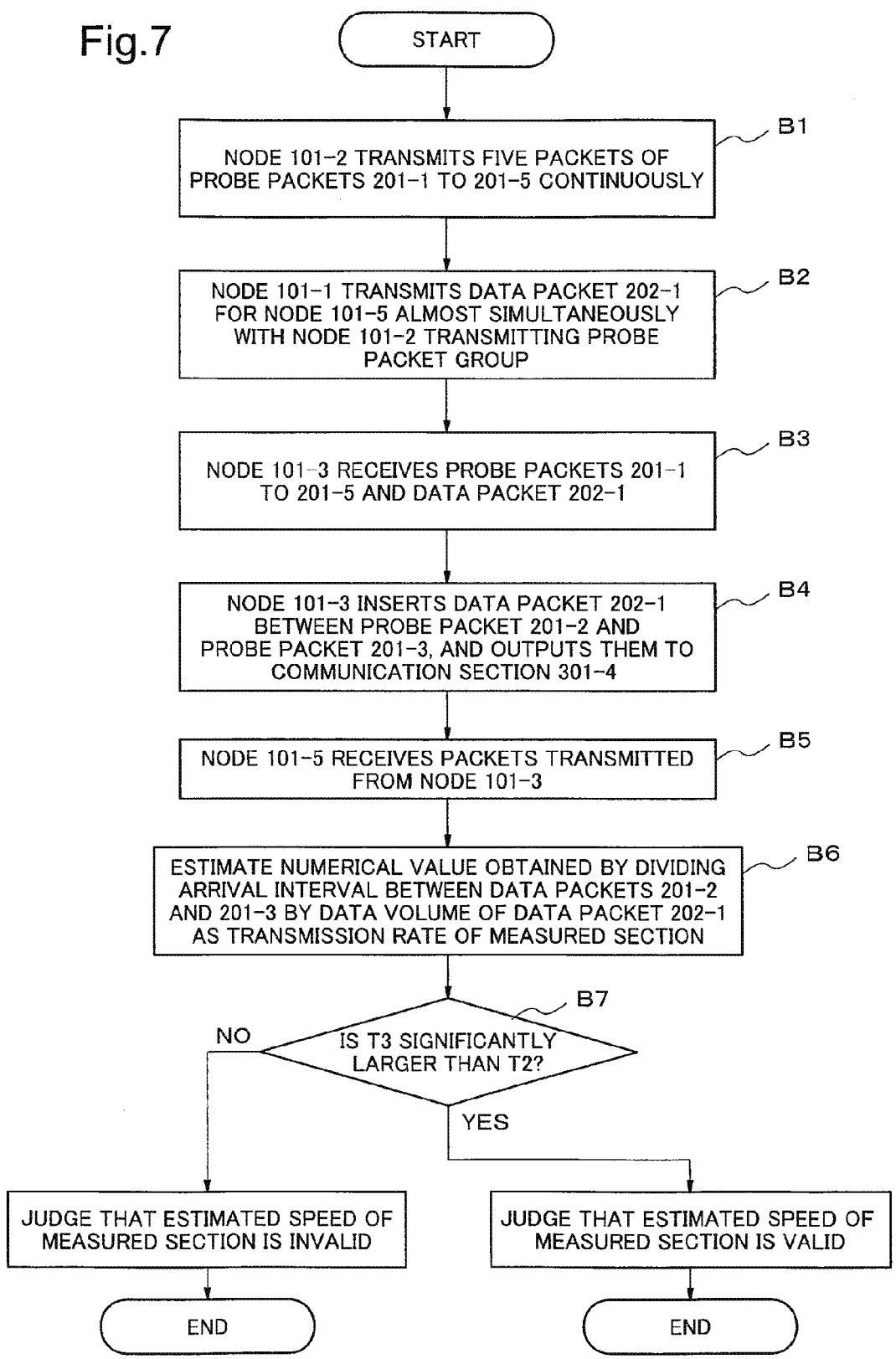
FIG. 7 is a diagram showing a procedure of a speed estimation method in the second exemplary embodiment.

The second exemplary embodiment of the present invention will be described using FIGS. 6-8. In the second exemplary embodiment, FIG. 6 is a diagram showing a state that packets exist between the node 101-1 and the node 101-3 and between the node 101-2 and the node 101-3. FIG. 7 is a diagram showing a procedure of a speed estimation method in the second exemplary embodiment.

According to the second exemplary embodiment, a measured section is the communication section 301-4. Also, it is supposed that the communication section 301-2 has a speed lower than the measured section 301-4.

In FIG. 6, the route of a probe packet is a route from the node 101-2 to the node 101-5 that is the destination via the node 101-3. The route of data packet 202-1 is a route from the node 101-1 to the node 101-5 that is the destination via the node 101-3. Hereinafter, a procedure of a speed estimation method in the second exemplary embodiment will be described also referring to each step of FIG. 7.

The node 101-2 that is the starting point of the probe packets shown in FIG. 6 transmits five packets of the probe packets 201-1 to 201-5 continuously (Step B1 of FIG. 7). It is supposed that an arrival time difference at the node 101-3 between each probe packet and a probe packet just after the former in the communication section 301-2 is T2. On the other hand, the node 101-1 transmits the data packet 202-1 for the node 101-5 almost simultaneously with the node 101-2 transmitting the probe packet group (Step B2).

Figure 8:
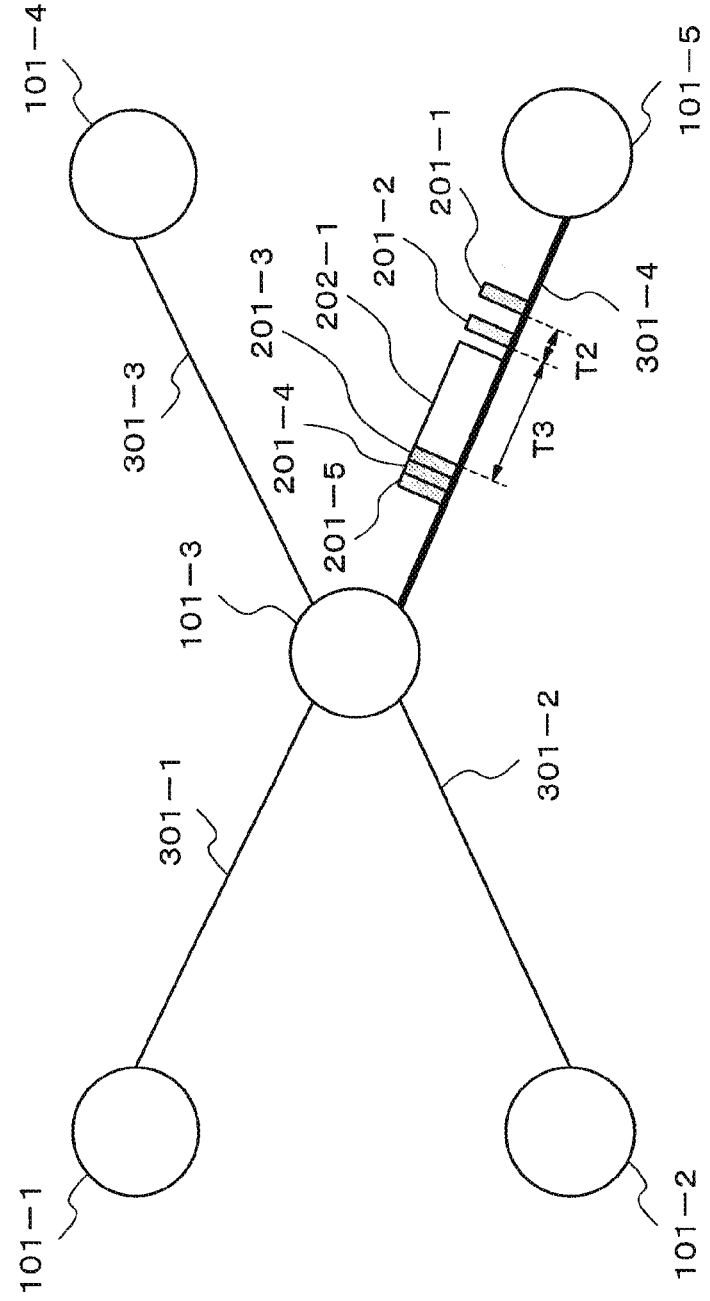
FIG. 8 is a diagram showing a state after packets have passed the node 101-3 in the second exemplary embodiment.

FIG. 8 is a diagram showing a state after the packets have passed the node 101-3 in the second exemplary embodiment. In FIG. 8, the probe packets 201-2 and 201-3 are collision packets.

In FIG. 8, the node 101-3 receives the probe packets 201-1 to 201-5 and the data packet 202-1 (Step B3). Then, the node 101-3 outputs the probe packets 201-1 to 201-5 and the data packet 202-1 to the communication section 301-4 that is the measured section. Here, the node 101-3 inserts the data packet 202-1 between the probe packet 201-2 and the probe packet 201-3, and outputs the packets to the communication section 301-4 (Step B4).

The node 101-5 receives the packets transmitted from the node 101-3 (step B5). Because the measured section 301-4 is of a higher-speed than the communication section 301-2, the higher the transmission rate of the measured section 301-4 is, the smaller a time difference between arrival time of the head and arrival time of the end of each of the probe packets at the node 101-5 is. However, a change in a difference between arrival time of the head and the end of each probe packet does not have influence on arrival intervals of the probe packets 201-1 to 201-5 at the node 101-5. For this reason, even if the arrival intervals of the probe packets besides the collision packets are measured by the node 101-5, the transmission rate of the measured section 301-4 cannot be estimated.

Here, an arrival interval between two packets among the packets which have been transmitted just before and immediately after the data packet 202-1, an arrival interval T3 between the probe packets 201-2 and 201-3 at the node 101-5, for example, will be considered. As shown in FIG. 8, the data packet 202-1 is inserted between the two packets, and transmitted. Accordingly, T3 includes a difference between arrival time of the head and that of the end of the data packet 202-1 to the node 101-5. On the other hand, in the communication section 301-4, a data packet does not exist between the probe packets 201-1 and 201-2. Accordingly, an arrival interval T2 between the probe packets 201-1 and 201-2 does not include a difference between arrival time of the head and the end of the data packet 202-1 to the node 101-5. Consequently, when T3 is larger than T2, it can be presumed that T3 reflects the transmission rate of the measured section 301-4.

That is, a numerical value which is obtained by dividing the arrival interval T3 between the probe packets 201-2 and 201-3 by the data volume of the probe packet 202-1 is estimated as the transmission rate of the measured section 301-4 (Step B6). Then, it is judged whether T3 is significantly larger than T2 or not (Step B7). When T3 is significantly larger than T2, it is 10 determined that the estimated transmission rate of the measured section 301-4 is valid (step B7: YES). When it cannot be judged that T3 is significantly larger than T2 (step B7: NO), it is determined that the estimated speed of the measured section 301-4 is invalid.

Here, being significant means that a difference between T3 and T2 makes it possible to judge that the data packet 202-1 is being transmitted in a manner being inserted between the probe packets 201-2 and 201-3. When a random delay, fluctuation, or the like exists in a communication section, for example, it may be judged as being significant when, after taking a margin to the width of the fluctuation into account, a difference between T3 and T2 is greater than the width of the fluctuation.

Thus, the second exemplary embodiment of the present invention has an effect that it is possible to judge validity of a measurement result of a transmission rate by a result of comparing a receiving interval between probe packets transmitted just before and immediately after a data packet, and a receiving interval between probe packets continuously transmitted.

Meanwhile, each of the nodes 101-1, 101-2 and 101-5 in the second exemplary embodiment can be realized using a node of the same structure as a node described in association with FIG. 4 and FIG. 5 in the first exemplary embodiment. Also, it is obvious that the node 101-3 can be realized using a node having a structure in which the nodes described by FIG. 4 and FIG. 5 are combined. Therefore, detailed description of a structure and an operation of each node in the second exemplary embodiment will be omitted.

Here, in FIG. 6, description has been made using a network configuration in which the node 101-1 transmits the data packet 202-1 and the node 101-2 transmits the probe packets 201-1 to 201-5. However, even by a structure including only the node 101-3, the communication section 301-4 and the node 101-5, the same effect as the above mentioned description can be obtained.

That is, a transmission node shown in FIG. 4 is arranged as the node 101-3, and the packet generation unit 152 is composed such that it generates the data packet 202-1 and the probe packets 201-1 to 201-5. The transmission unit 151 transmits the data packet 202-1 and the probe packets 201-1 to 201-5 to the communication section 301-4 continuously in the order shown in FIG. 8. By carrying out the procedures of step B5 or later of FIG. 7 similarly, the node 101-5 can estimate the transmission rate of the communication section 301-4 and judge its validity.

Thus, even in a case when the network configuration of FIG. 6 is a structure in which only the node 101-3 and the node 101-5 are connected by the communication section 301-4, an effect that validity of a measurement result of a transmission rate can be judged is obtained by a result of comparing a receiving interval between probe packets transmitted just before and immediately after a data packet, and a receiving interval between probe packets transmitted continuously.

The Third Exemplary Embodiment

Figure 9:
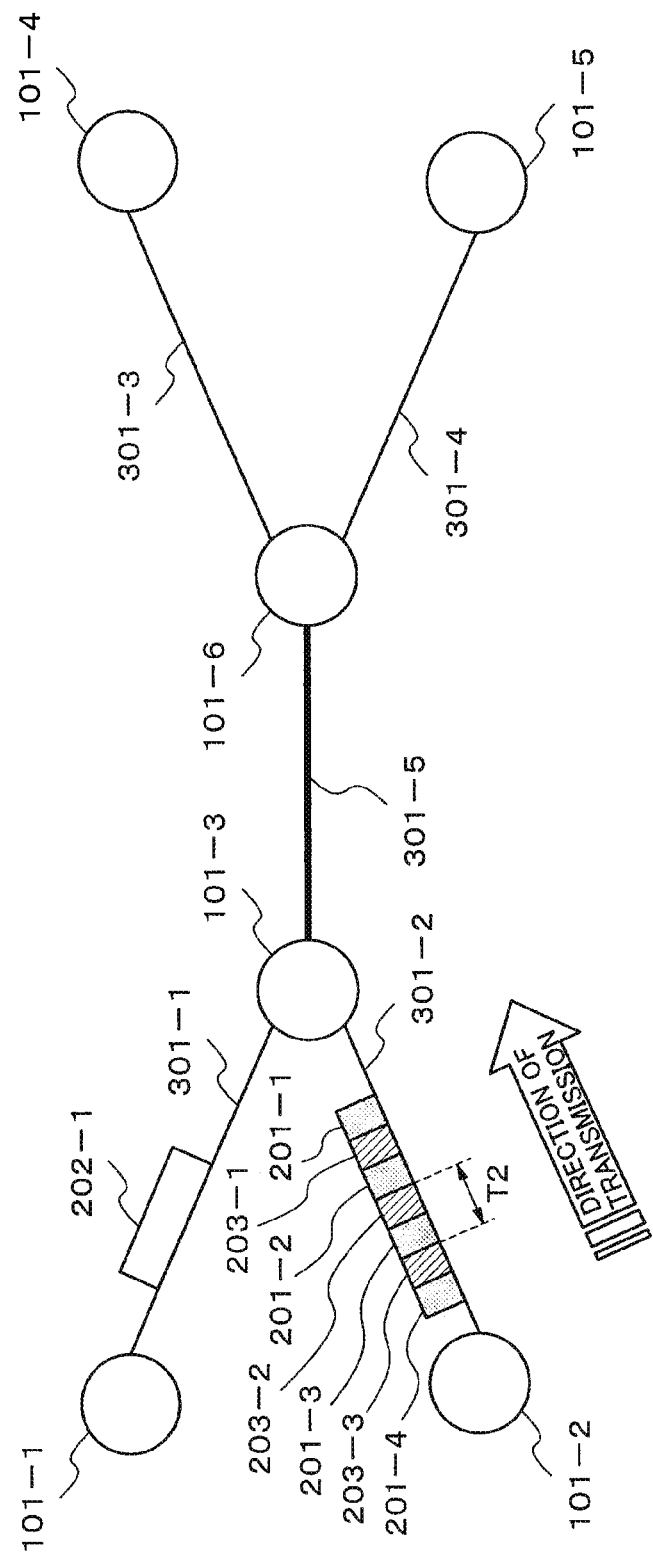
FIG. 9 is a diagram showing a state that packets exist between a node 101-1 and a node 101-3, and between a node 101-2 and node 101-3 in a third exemplary embodiment.
Figure 10:
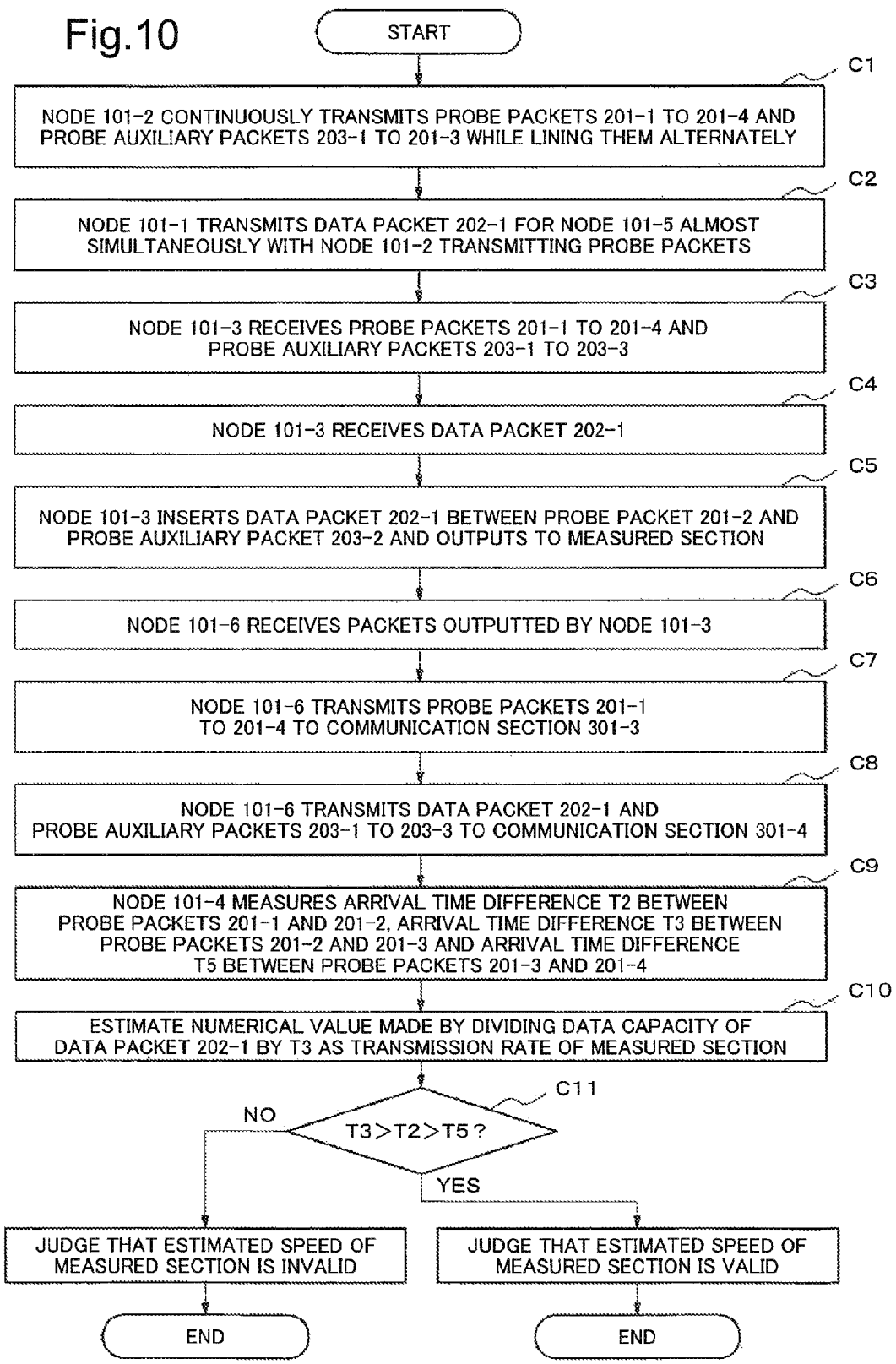
FIG. 10 is a diagram showing a procedure of a speed estimation method in the third exemplary embodiment.

The third exemplary embodiment of the present invention will be described using FIGS. 9-12. In FIGS. 9-12, a section to be measured is a communication section 301-5. FIG. 9 is a diagram showing a state that packets exist between a node 101-1 and a node 101-3, and between a node 101-2 and the node 101-3 in the third exemplary embodiment. FIG. 10 is a diagram showing a procedure of a speed estimation method in the third exemplary embodiment. In the third exemplary embodiment, it is assumed that the transmission rate of a measured section 301-5 is of a speed higher than transmission rates of any of communication sections 301-2, 301-3 and 301-4. Hereinafter, a procedure of a speed estimation method in the third exemplary embodiment will 15 be described also referring to each step of FIG. 10.

As shown in FIG. 9, the starting point node 101-2 of a probe route continuously transmits seven packets of probe packets 201-1 to 201-4 and probe auxiliary packets 203-1 to 203-3 while lining them alternately to the communication section 301-2 (Step C1). The route of the probe packets 201-1 to 201-4 is a route from the node 101-2 to a node 101-4 via the node 101-3 and a node 101-6. Also, the route of the probe auxiliary packets 203-1 to 201-3 is a route from the node 101-2 to a node 101-5 via the node 101-3 and the node 101-6.

An arrival time difference of T2 occurs between each probe packet at the node 101-3 side of the communication section 301-2.

On the other hand, the node 101-1 transmits the data packet 202-1 for the node 101-5 almost simultaneously with the node 101-2 transmitting the probe packet group (Step C2). The route of the data packet 202-1 is a route from the node 101-1 to the node 101-5 via the node 101-3 and the node 101-6.

Figure 11:
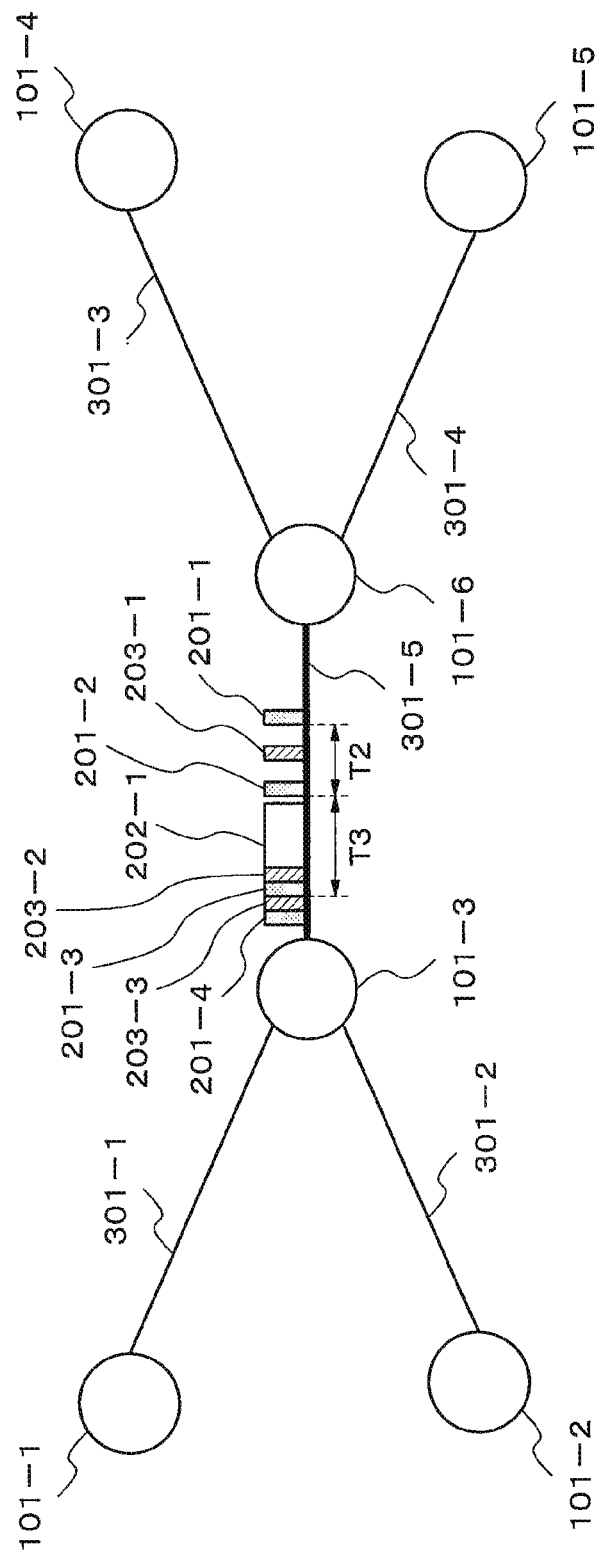
FIG. 11 is a diagram showing a state after packets have passed the node 101-3 in the third exemplary embodiment.

FIG. 11 is a diagram showing a state after the packets have passed the node 101-3 in the third exemplary embodiment. The node 101-3 receives the probe packets 201-1 to 201-4 and the probe auxiliary packets 203-1 to 203-3 from the communication section 301-2 (step C3). The node 101-3 receives the data packet 202-1 from the communication section 301-1 (Step C4). Then, the node 101-3 inserts the data packet 202-1 between the probe packet 201-2 and the probe auxiliary packet 203-2 and outputs the packets to the communication section 301-5 that is the measured section (Step C5). The node 101-6 receives the packets outputted by the node 101-3 (step C6).

In FIG. 11, the measured section 301-5 is of a speed higher than the communication section 301-2. Accordingly, the higher a transmission rate of the measured section 301-5 is, the smaller a difference between arrival time of the head and the arrival time of the end of each of the probe packets and the probe auxiliary packets at the node 101-6 is. However, that a difference between arrival time of the head of and the end of each of these packets is small does not have influence on a difference between arrival time to the node 101-6 of the probe packets and the probe auxiliary packets which is not colliding with the data packet.

On the other hand, in FIG. 11, a case where two packets among the probe packets or the probe auxiliary packets which have been transmitted simultaneously just before and immediately after the data packet 202-1, for example, 201-2 and 201-3, arrive at the node 101-6 is considered. In this case, the arrival interval T3 between two packets of the probe packets 201-2 and 201-3 to the node 101-6 includes a difference between arrival time of the head and the end of the data packet 202-1 to the node 101-6. Accordingly, if it is larger than the arrival interval T2 between the probe packet 201-1 and 201-2 which have been arrived before the collision with the data packet, it is judged that T3 is reflecting the transmission rate of the measured section 301-5.

Figure 12:
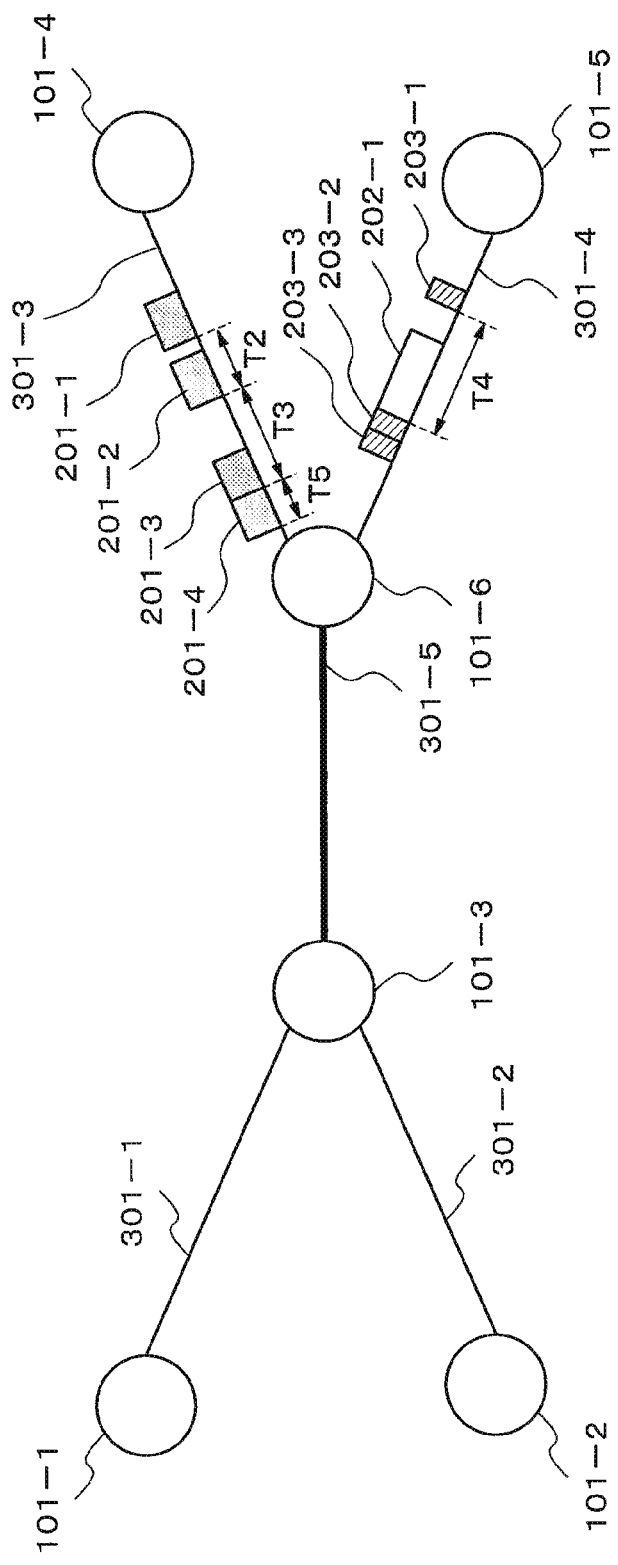
FIG. 12 is a diagram showing a state after probe packets, probe auxiliary packets and a data packet have passed a node 101-6 in the third exemplary embodiment.

FIG. 12 is a diagram showing a state after the probe packets 201-1 to 201-4, the probe auxiliary packets 203-1 to 203-3 and the data packet 202-1 have passed the node 101-6 in the third exemplary embodiment. In FIG. 12, the node 101-6 transmits the probe packets 201-1 to 201-4 to the communication section 301-3 (Step C7). Also, the node 101-6 transmits the data packet 202-1 and the probe auxiliary packets 203-1 to 203-3 to the communication section 301-4 (Step C8).

Here, the transmission rates of the communication sections 301-3 and 301-4 are of a speed lower than the transmission rate of the measured section 301-5 together. Accordingly, in the communication section 301-4, due to influence of a delay of the data packet 202-1, an arrival time differences T4 between the probe auxiliary packets 203-1 and 203-2 to the node 101-5 expands further compared with the time when passing the measured section 301-5. Accordingly, even if an arrival interval of a packet is measured by the node 101-5, the transmission rate of the measured section 301-5 cannot be estimated accurately.

On the other hand, the node 101-4 receives the probe packets 201-2 to 201-4. The node 101-4 measures the arrival time difference T2 between the probe packets 201-1 and 201-2, the arrival time difference T3 between the probe packets 201-2 and 201-3 and an arrival time difference T5 between the probe packets 201-3 and 201-4 (Step C9).

Then, a numerical value made by dividing the data capacity of the data packet 202-1 by T3 is estimated as the transmission rate of the measured section 301-5 (Step C10).

Here, when the end of the probe packet 201-1 and the head of the following probe packet 201-2 do not collide with each other by delay of the communication section 301-3, that is, when T3>T2, it can be thought that T3 reflects the transmission rate of the measured section 301-5.

In addition, even if a state that the head of the probe packet 201-4 collides with the end of the probe packet 201-3 occurs by delay of the communication section 301-3, the end of the probe packet 201-1 does not collide with the head of the following probe packet 201-2. This is because, in the communication sections 301-2 and 301-5, the probe auxiliary packet 203-1 has been transmitted between the probe packets 201-1 and 201-2. Accordingly, when T5 is smaller than T2, that is, T5<T2, it can be thought that the end of the probe packet 201-1 does not collide with the head of the probe packet 201-2. In this case, a receiving interval between probe packets measured at the node 101-4 is judged to be reflecting the transmission rate of the measured section 301-5.

When the above mentioned conditions are put together, in the third exemplary embodiment, the condition by which an estimation of a transmission rate is judged to be valid will be T3>T2>T5. Accordingly, when whether the relation of T3>T2>T5 is satisfied or not at the node 101-4 is confirmed (Step C11) and it is satisfied (Step C11: YES), it is determined that the estimated transmission rate of the measured section 301-5 is valid. When the relation of T3>T2>T5 is not satisfied at the node 101-4 (Step C11: NO), it is determined that the estimated transmission rate of the measured section 301-5 is invalid.

Thus, in the third exemplary embodiment of the present invention, validity of a measurement result of a transmission rate is judged based on a result of comparing a receiving interval between probe packets transmitted just before and immediately after a data packet and a receiving interval between probe packets transmitted continuously. Further, according to the third exemplary embodiment, validity of a measurement result of a transmission rate is judged also based on a result of comparing a receiving interval between probe packets transmitted just before and immediately after a probe auxiliary packet and a receiving interval between probe packets transmitted continuously. As a result, the third exemplary embodiment has an effect that validity of a measurement result can be judged more correctly compared with the effect of the first and second exemplary embodiments.

Meanwhile, it is obvious that each of the nodes 101-1 to 101-6 in the third exemplary embodiment can be realized by using the same nodes as the nodes described in FIG. 4 and FIG. 5 in the first exemplary embodiment or nodes having a function which is made by combining these. Therefore, detailed description of a structure and an operation of each node in the third exemplary embodiment will be omitted.

Further, in FIG. 9, regarding the node 101-1 or 101-2 which is a transmission node, the packet generation unit 152 may be composed so that it may generate the data packet 202-1, the probe packets 201-1 to 201-4 and the probe auxiliary packets 203-1 to 203-3. Then, a transmission node may transmit the data packet 202-1, the probe packets 201-1 to 201-4 and the probe auxiliary packets 203-1 to 203-3 to the communication section 301-5 continuously in the order shown in FIG. 11. By such structure, the node 101-4 can have the same effect as the third exemplary embodiment by the procedures of Step C9 or later of FIG. 10

The Fourth Exemplary Embodiment

A speed estimation method of the fourth exemplary embodiment of the present invention: transmits probe packets to a first communication path including a measured section which is a target for measurement of a transmission rate continuously; transmits a data packet to a second communication path including the measured section; estimates the transmission rate of the measured section based on a first receiving interval which is a receiving interval between probe packets transmitted through the measured section just before and immediately after the data packet and the data volume of the data packet; and, when probe packets are transmitted before and after the data packet in a measured section, determines validity of a transmission rate by comparing a second receiving interval which is a receiving interval between probe packets which have passed through the measured section continuously in a state that a data packet does not exist in between the probe packets in the measured section and a first receiving interval.

The Fifth Exemplary Embodiment

A speed estimation method of the fifth exemplary embodiment of the present invention: continuously transmits a plurality of probe packets and probe auxiliary packets to a first communication path including a measured section which is a target for measurement of a transmission rate alternately; transmits a data packet to a second communication path including the measured section; when, in a measured section, one of a probe packet and a probe auxiliary packet is transmitted just before the data packet and the other of the probe packet and the probe auxiliary packet is transmitted just after the data packet, branches the probe packets, and the probe auxiliary packets and the data packet into different communication sections, respectively, after having passed the measured section; in a communication section after branching to which a probe packet is transmitted, estimates the transmission rate of the measured section based on a first receiving interval which is a receiving interval between the probe packets transmitted through the measured section just before and immediately after the data packet and the data volume of the data packet; and, by comparing a second receiving interval which is a receiving interval between the probe packets having passed the measured section continuously in a state that a data packet does not exist in between the probe packets in the measured section, a third receiving interval that is a receiving interval between the probe packets which have been transmitted through the measured section just before and immediately after a probe auxiliary packet and a first receiving interval, determines validity of the transmission rate.

The Sixth Exemplary Embodiment

The sixth exemplary embodiment of the present invention comprises: a reception means for receiving probe packets from a communication section; a data storage means for storing information on a data volume of a data packet; a reception timing measuring means for detecting a first receiving interval which is a receiving interval between the probe packets having been transmitted just before and immediately after the data packet through a measured section being a target of measurement of a transmission rate, and a second receiving interval which is a receiving interval of the probe packets having passed the measured section continuously in the measured section; and a speed estimation means for estimating a transmission rate of the measured section based on the first receiving interval and a data volume of the data packet, and judging validity of the transmission rate by comparing the first receiving interval and the second receiving interval.

The Seventh Exemplary Embodiment

A control program of a speed estimation apparatus of the seventh exemplary embodiment of the present invention causes a speed estimation apparatus function as: a reception means for receiving probe packets from a communication section; a data storage means for storing information on a data volume of a data packet; a reception timing measuring means for detecting a first receiving interval which is a receiving interval of the probe packets having been transmitted just before and immediately after the data packet through a measured section being a target of measurement of a transmission rate, and a second receiving interval which is a receiving interval of the probe packets having passed the measured section continuously in the measured section; and a speed estimation means for estimating a transmission rate of the measured section based on the first receiving interval and a data volume of the data packet, and judging validity of the transmission rate by comparing the first receiving interval and the second receiving interval.

While the invention has been particularly shown and described with reference to the first, second and third exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2010-097625, filed on Apr. 21, 2010, the disclosure of which is incorporated herein in its entirety by reference.

DESCRIPTION OF SYMBOLS

101-1, 101-2, 101-3, 101-4, 101-5, 101-6 Node
201-1, 201-2, 201-3, 201-4 Probe packet
202-1, 202-2 Data packet
203-1, 203-2, 203-3 Probe auxiliary packet
301-1, 301-2, 301-3, 301-4, 301-5 Communication section
151 Transmission unit
161 Reception unit
152 Packet generation unit
162 Packet reception buffer
153 Transmission timing generator
163 Reception timing measurement unit
164 Data storage
165 Speed estimation unit
156, 166 Control unit
157, 167 CPU
158, 168 Memory

The invention claimed is:

1. A transmission rate estimation method, comprising the steps of:
   transmitting to a measured section a data packet and probe packets before and after said data packet, said measured section being a measurement target of a transmission rate;
   estimating a transmission rate of said measured section based on a first receiving interval which is a receiving interval between said probe packets transmitted through said measured section just before and immediately after said data packet and a data volume of said data packet; and
   determining validity of said transmission rate by comparing a second receiving interval which is a receiving interval between said probe packets having passed said measured section without interruption in a state, said data packet not existing in between said probe packets in said measured section, and said first receiving interval; wherein:
      as said probe packets, a first probe packet and a second probe packet are transmitted without interruption to a first communication path including said measured section alternately;
      said data packet and one of said first probe packet and said second probe packet are transmitted to said measured section, said one of said first probe packet and said second probe packet being transmitted just before said data packet;
      the other of said first probe packet and said second probe packet is transmitted just after said data packet;
      said first probe packet, a said second probe packet and said data packet are divided so that said first probe packet, and said second probe packet and said data packet may be transmitted to different communication sections, respectively, after passing said measured section;
      said first receiving interval is calculated, in a communication section after said dividing to which said first probe packet is transmitted, as a receiving interval between said first probe packets having been transmitted through said measured section just before and immediately after said data packet;
      based on said first receiving interval and a data volume of said data packet, a transmission rate of said measured section is estimated;
      said second receiving interval is calculated as a receiving interval between said first probe packets without interruption passing through said measured section in a state that said data packet does not exist in said measured section;
      a third receiving interval is calculated as a receiving interval between said first probe packets having been transmitted just before and immediately after said second probe packet through said measured section; and
      by comparing said first receiving interval, said second receiving interval and said third receiving interval, validity of said transmission rate is judged.

2. The transmission rate estimation method according to claim 1, wherein
   said probe packets are transmitted to a first communication path including said measured section without interruption, and said data packet is transmitted to a second communication path including said measured section.

3. The transmission rate estimation method according to claim 1, wherein
   said transmission rate is estimated as a numerical value made by dividing said data volume by said first receiving interval; and wherein
   validity of said transmission rate is judged to be valid when said first receiving interval is larger than said second receiving interval.

4. The transmission rate estimation method according to claim 1, wherein
   said probe packets and said data packet are transmitted to different communication sections, respectively, after passing said measured section.

5. The transmission rate estimation method according to claim 1, wherein
   said transmission rate is estimated as a numerical value made by dividing said data volume by said first receiving interval; and wherein
   validity of said transmission rate is judged to be valid when said first receiving interval is larger than said second receiving interval and, in addition, said second receiving interval is larger than said third receiving interval.

6. The transmission rate estimation method according to claim 1, wherein
   after having passed said measured section, said first probe packet, and said data packet and said second probe packet are transmitted to different communication sections, respectively.

* * * * *